United States Patent
Sauber

(10) Patent No.: US 7,130,935 B2
(45) Date of Patent: *Oct. 31, 2006

(54) SYSTEM AND METHOD FOR USING A SWITCH TO ROUTE PERIPHERAL AND GRAPHICS DATA ON AN INTERCONNECT

(75) Inventor: William F. Sauber, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/085,401

(22) Filed: Mar. 21, 2005

(65) Prior Publication Data

US 2005/0165992 A1   Jul. 28, 2005

Related U.S. Application Data

(63) Continuation of application No. 10/386,743, filed on Mar. 11, 2003, now Pat. No. 6,874,042.

(51) Int. Cl.
*G06F 13/00* (2006.01)

(52) U.S. Cl. .......................... 710/38; 710/31; 710/316; 710/306; 345/501; 345/530

(58) Field of Classification Search ............... 710/100, 710/305–317, 29–32, 38; 345/501–503, 345/519, 537, 541–542; 711/2
See application file for complete search history.

(56) References Cited

U.S. PATENT DOCUMENTS

| | | | |
|---|---|---|---|
| 5,630,174 A | 5/1997 | Stone et al. ................... 710/63 |
| 5,815,167 A | 9/1998 | Muthal et al. ............... 345/541 |
| 5,854,637 A | 12/1998 | Sturges ........................ 345/542 |
| 5,920,881 A | 7/1999 | Porterfield ...................... 711/2 |
| 5,941,968 A | 8/1999 | Mergard et al. ............. 710/308 |
| 6,070,215 A | 5/2000 | Deschepper et al. ........ 710/309 |
| 6,094,700 A | 7/2000 | Deschepper et al. ........ 710/313 |
| 6,097,403 A | 8/2000 | McMinn ..................... 345/519 |
| 6,148,357 A | 11/2000 | Gulick et al. ............... 710/309 |
| 6,151,651 A * | 11/2000 | Hewitt et al. ............... 710/315 |
| 6,185,642 B1 | 2/2001 | Beukema et al. ............. 710/60 |
| 6,256,700 B1 | 7/2001 | Sauber ........................ 710/129 |
| 6,346,946 B1 | 2/2002 | Jeddeloh ..................... 345/503 |
| 6,356,968 B1 | 3/2002 | Kishon ........................ 710/306 |
| 6,505,260 B1 * | 1/2003 | Chin et al. .................... 710/41 |
| 6,546,449 B1 * | 4/2003 | Aleksic et al. .............. 710/312 |
| 6,567,868 B1 | 5/2003 | Tran et al. .................... 710/60 |
| 6,611,891 B1 | 8/2003 | Hewitt et al. ............... 710/306 |
| 6,618,770 B1 | 9/2003 | Nayyar et al. ................. 710/3 |
| 2002/0097234 A1 * | 7/2002 | Sauber ........................ 345/204 |

OTHER PUBLICATIONS

Intel Corporation's "PHY Interface for the PCI Express™ Architecture," Specification Version 0.5. pp. 1-15.

(Continued)

*Primary Examiner*—Christopher Shin
(74) *Attorney, Agent, or Firm*—Baker Botts L.L.P.

(57) ABSTRACT

A system and method for using a switch to route graphics data and data for a peripheral data on an interconnect is disclosed. A graphics card includes a switch that is communicatively coupled to a computer system. The switch receives graphics data and data for a peripheral device from the computer system via a first link. The switch routes the data for a peripheral device to a console via a second link and routes the graphics data to a graphics controller via a third link. The graphics controller forms a part of the graphics card and is communicatively coupled to the switch via the third link, wherein the graphics controller generates a video signal to drive a video display.

17 Claims, 3 Drawing Sheets

OTHER PUBLICATIONS

Intel Corporation's "Board Design Guidelines for PCI Express™ Interconnect," at internet address <http://www.intel.com/technology/pciexpress/downloads/PCI_EI_PCB_Guidelines.pdf> pp. 1-4.

Intel Corporation's "Digital Visual Interface Comes into Focus," at internet address<http://www.intel.com/update/archive/issue22/stories/top6.htm> pp. 1-4.

Digital Display Working Group—Downloads at <http://www.ddwg.org/downloads.html> 2 pages.

PCI Express', "PCI Express Card Electromechanical Specification Revision 1.0" 82 Pages.

PCI Express', "PCI Express Base Specification Revision 1.0" 422 Pages.

PCI Sig's "PCI Express: Performance Scalability for the Next Decade," at internet address <http://www.pcisig.com/specifications/pciexpress> 1 Page.

PCI Sig's "PCI Express: Performance Scalability for the Next Decade—Members -Download the Specification," at internet address <http://www.pcisig.com/specifications/pciexpress> 1 Page, Printed Nov. 7, 2002.

A1 Electronics' "3Gio 3rd Generation I/O, PCI Express local bus system review," at internet address <http://www.a1-electronics.co.uk/PcHardware/3GIO.PCIbussystem.shtml> 3 Pages, Printed Nov. 8, 2002.

Intel Corporation Whitepaper on "Advanced Switching for the PCI Express• Architecture," 12 Pages, no date.

PCI Sig's "PCI Sig PCI Express™ Frequently Asked Questions," at internet address<http://www.pcisig.com/data/specifications/PCIExpress10FAQ.pdf> 4 Pages, Jul. 24, 2002.

Intel Corporation's "PCI Express• (formerly Third Generation I/O Architecture)," at Internet address <http://www.intel.com/technology/pciexpress/> 1 Page. Printed Mar. 3, 2003.

\* cited by examiner

SYSTEM AND METHOD FOR USING A SWITCH TO ROUTE PERIPHERAL AND GRAPHICS DATA ON AN INTERCONNECT

CROSS REFERENCE TO RELATED APPLICATION

This application is a continuation of U.S. Pat. application Ser. No. 10/386,743 filed by William F. Sauber on Mar. 11, 2003, now U.S. Pat. No. 6,874,042.

TECHNICAL FIELD

This disclosure relates in general to the field of computers, and more particularly to a system and method for using a switch to route peripheral and graphics data on an interconnect.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A computer system is one type of information handling system. Examples of the computer system include a server, a workstation, a desktop computer, a notebook computer, a laptop computer, and a hand-held device. The computer system, typically, includes a microprocessor, memory, a video display, a keyboard, a mouse, storage devices, media drives and optical drives.

The computer system may also include peripheral devices, such as a keyboard, a mouse, disk drives, that connect to the computer via input/output (I/O) ports. The I/O ports allow the peripheral devices to communicate with the processor and in some cases other devices through a bus such as a peripheral component interconnect (PCI) bus. In general, the bus may include a parallel or a serial interface for connecting the peripheral devices to the computer system.

FIG. 1 is a schematic view of conventional PCI bus architecture system 10 including microprocessor 12 and memory chips 14 connected to chipset 20. Microprocessor 12 may connect to chipset 20 via microprocessor bus 13. Memory chips 14 communicates to chipset 20 via memory chip bus 15. Chipset 20 includes memory hub 22 and I/O hub 24 connected via chipset bus 23. Video card 40 receives graphics data from microprocessor 12 and memory chips 14 through memory hub 22 via video card bus 38. Video card 40 creates the video signal for display on a monitor.

I/O hub 24 connects multiple computer components to microprocessor 12 and memory chips 14. Typically, the I/O hub 24 connects devices in parallel using a different interface for each type of device. For example, I/O hub 24 may include a universal serial bus ("USB") interface to allow USB devices to connect to I/O hub 24 via USB ports 28e. Similarly, 1394 adapter 30 connects to I/O hub 24 using a PCI interface to permit microprocessor 12 and memory chips 14 to communicate with a 1394 device. Additionally, encode and decode device ("CODEC") 32, mainly used with audio data, connects to I/O hub 24, which provides a connection for audio components and may also include an interface within I/O hub 24.

Hard disk drive 26 is one type of storage media that may be used with conventional PCI bus architecture system 10. Hard disk drive 26 connects to I/O hub 24 via an interface bus dedicated for storage media information, such as a small computer system interface ("SCSI") and an integrated device electronics ("IDE") interface.

PCI cards 34 may connect in parallel to I/O hub 24 via PCI bus 33. PCI cards 34 provide separate connections for allowing a computer component to communicate with microprocessor 12 and memory chips 14 via PCI card ports 35.

As consumer demand faster computer speeds and performance, technological innovations have exceed the capabilities of current bus architectures such as the conventional PCI bus architecture. Technological innovations including high performance graphics, faster memory and microprocessors, networking, and computer devices have created a need for a high performance, greater bandwidth interconnects. In order to meet this need, a new interconnect architecture has been developed to provide high speed, point-to-point interconnect architecture commonly referred to as PCI Express architecture. The specification for the PCI Express architecture is described in the PCI Express Specification 1.0 available through PCI-SIG, which is hereby incorporated by reference in its entirety.

PCI Express architecture is a general purpose input/output (I/O) serial interconnect that provides a highly scalable bandwidth interconnect for attaching devices such as high performance graphics, universal serial bus (USB) ports, networking and other such devices. Because PCI Express architecture may connect to several different types of devices, the architecture provides a unifying standard for communications in order to consolidate these devices on a single interconnect.

System designs for PCI Express architecture, however, provide a separate link for graphics data and data for peripheral devices. Thus, a computer system that uses a PCI Express architecture may use a first link for graphics data and a second link for peripheral data. For example, a printed circuit board such as a motherboard in a computer system may use a first graphics link to interconnect a processor to a graphics controller through a memory hub such that the first graphics link carries only graphics data. A second link, formed on the motherboard, typically carries peripheral data from the processor to computer components.

SUMMARY

Thus, a need has arisen for a system and method for using a switch to route graphics data and data for a peripheral device on an interconnect.

A further need has arisen for a system for routing graphics data and data for a peripheral device on a standard graphics link.

A further need has arisen for a system for routing both a video signal and data to peripheral devices using a single cable.

In accordance with the teachings of the present invention, the disadvantages and problems associated with routing peripheral data and graphics data on interconnects have been substantially reduced or eliminated. In some embodiments of the present disclosure, a graphics card includes a switch that is communicatively coupled to a computer system. The switch receives graphics data and data for a peripheral device from the computer system via a first link. The switch routes the data for a peripheral device to a console via a second link and routes the graphics data to a graphics controller via a third link using standard PCI Express mechanisms. The graphics controller forms a part of the graphics card and is communicatively coupled to the switch via the third link, wherein the graphics controller generates a video signal to drive a video display.

In other embodiments, a system for routing graphics data and data for a peripheral device in a computer system includes a processor, a memory, a memory hub, a first link, and a graphics card. The memory is communicatively coupled to the processor via the memory bridge. The first link communicatively connects the graphics card to the memory and the processor via the memory bridge, wherein the first link carries graphics data and data for a peripheral device. The graphics card couples to the computer system and includes a first switch and a graphics controller. The first switch is disposed on the graphics card and is communicatively coupled to the computer system. The first switch receives the graphics data and the data for the peripheral device from the computer system via the first link. The first switch routes the data for the peripheral device onto a second link and routes the graphics data onto a third link. The graphics controller forms a part of the graphics card and is communicatively coupled to the first switch via the third link. The graphics controller receives the graphics data and generates a video signal to drive a video display.

In further embodiments, a method for using a switch to route graphics data and data for a peripheral device on an interconnect includes receiving data at a switch coupled to a graphics card via a first link. The switch determines whether the data is graphics data or data for a peripheral device based on an address contained in the data. Following the determination, the switch routes the graphics data to a second link and the data for the peripheral device to a third link.

The present disclosure contains a number of important technical advantages. One technical advantage is providing a switch for routing graphics data or data for a peripheral device on a high bandwidth interconnect. The high bandwidth interconnect incorporates the PCI Express architecture to transmit data in packet-based split transactions or packets along the interconnect. Because the switch discriminates between graphics data and data for a peripheral device, the switch routes the graphics data to a graphics controller via a graphics link. Data for a peripheral device, however, are forwarded to the peripheral device or other endpoint connection via a second link.

Another technical advantage includes a system and method for routing graphics data and data for a peripheral device on a standard graphics link. Because the PCI Express architecture uses a standardized transfer format that includes address information, both graphics data and data for a peripheral device may be sent along a standard graphics link. A switch placed on the graphics card routes the data to the appropriate device based on the address information. Thus, a standard graphics link may be used to receive and send both graphics data and data for peripheral device.

A further technical advantage includes a system for routing both a video signal and data for a peripheral device using a single cable. Because a video signal, generated by the graphics card, and data for a peripheral device are routed from a switch on the graphics card, a single connection that includes both the video signal and data for the peripheral device may be provided on the graphics card. Thus, a single cable connection may allow a user to place peripheral devices and a monitor within reach of the user, while the computer system is placed at a distance.

All, some, or none of these technical advantages may be present in various embodiments of the present invention. Other technical advantages will be apparent to one skilled in the art from the following figures, descriptions, and claims.

BRIEF DESCRIPTION OF THE DRAWINGS

A more complete understanding of the embodiments of the present disclosure and advantages thereof may be acquired by referring to the following description taken in conjunction with the accompanying drawings, in which like reference numbers indicate like features, and wherein.

DETAILED DESCRIPTION

Preferred embodiments of the present disclosure and their advantages are best understood by reference to FIGS. 1 through 5, where like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices, as well as various input and output (I/O) devices, such as a keyboard, a mouse, and a video display. The information handling system may also include one or more buses operable to transmit communications between the various hardware components.

Figure 1:
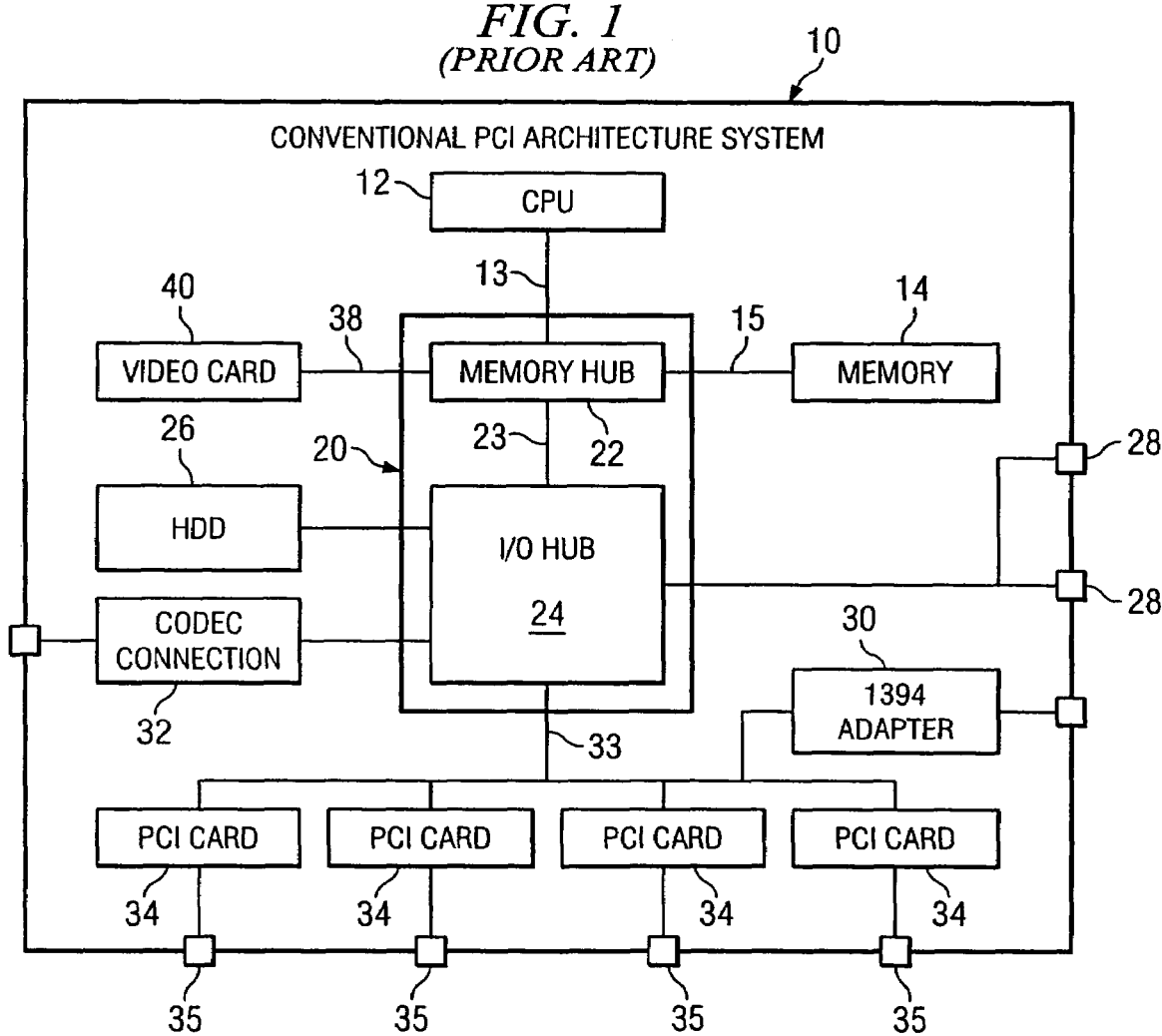
FIG. 1 is a schematic view of a conventional PCI bus architecture system.
Figure 2:
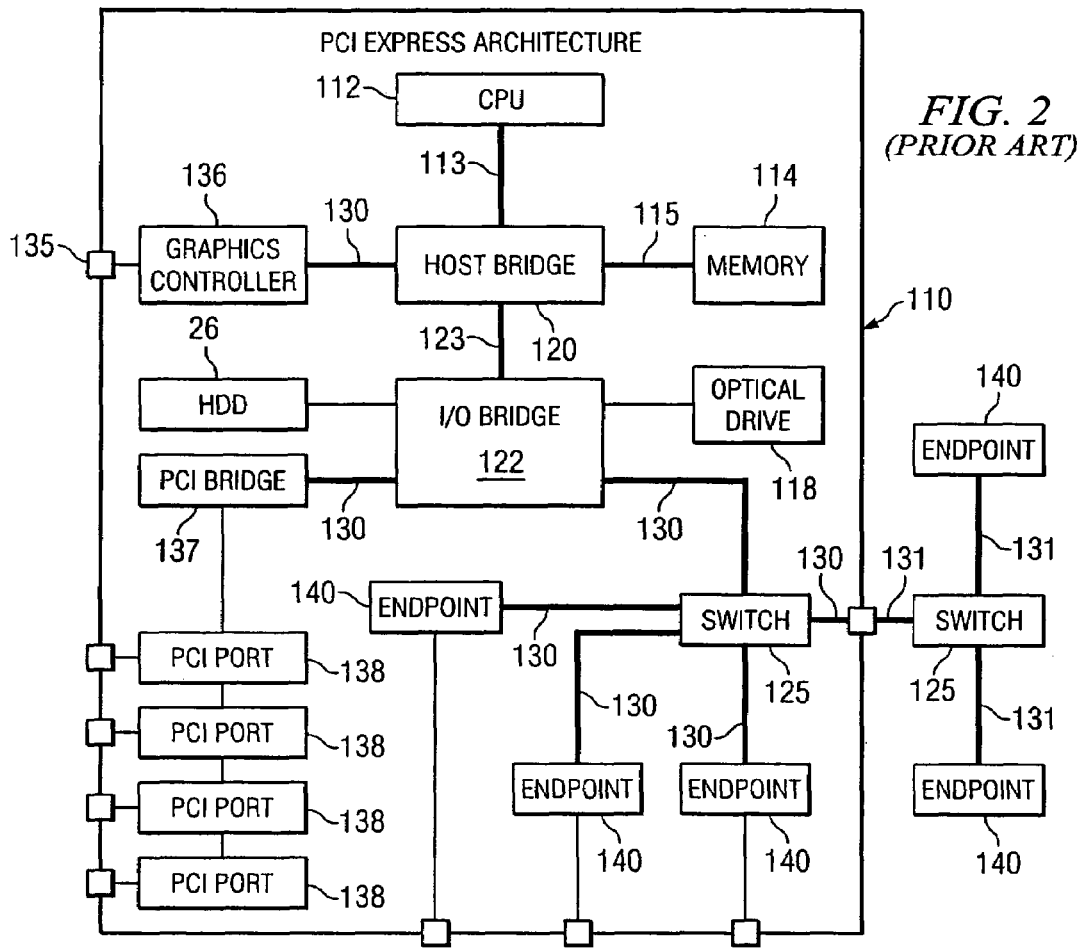
FIG. 2 is a schematic view of a PCI Express architecture system.

Referring to FIG. 2, PCI Express architecture system 110 may include central processing unit ("CPU") 112, memory 114, host bridge 120 and I/O bridge 122. CPU 112 communicates with host bridge 120 via CPU bus 113. Memory 114 communicates with host bridge 120 via memory bus 115.

PCI Express architecture uses a protocol that includes a serial, point-to-point, switched architecture for the transmission of data on an interconnect. Accordingly, the data is partitioned into packet-based split transactions or packets, which contain an address for routing each packet to the correct destination on the interconnect. The interconnect having the PCI Express architecture includes two or more differential signal pairs in which one pair is used for transmitting information and the other pair for receiving information on the interconnect. By increasing the quantity of differential signal pairs, the interconnect increases the bandwidth by creating multiple signal lanes for transmitting information.

Graphics controller 136 connects to host bridge 120 via PCI Express link 130, which uses the PCI Express architecture. Graphics controller 136 communicates with CPU 112 and memory 114 through host bridge 120 to generate a video signal. Graphics controller 136 may transmit the video signal to a display or monitor connected at graphics controller port 135.

Additionally, I/O bridge 122 may communicate through I/O link 123 and host bridge 120 to provide communications for hard disk drive 26. Hard disk drive 26 may communicate with CPU 112 and memory 114 through I/O bridge 122 via host bridge 120. Similarly, optical drives such as CD-ROM and DVD drives may connect to I/O bridge 122 to access other components of PCI Express architecture system 110.

PCI bridge 137 connects to host bridge 120 at the I/O bridge 122 via PCI Express link 130. PCI bridge 137 provides a connection slot for one or more PCI ports 138 to access other components of PCI Express architecture system 110. A PCI card may attach to each PCI port 138 in the system.

Switch 125 connects to I/O bridge 122 via PCI Express link 130. Switch 125 allows multiple endpoint connections 140 to share a single interconnect by directing the packets of information to the corresponding endpoint connection 140 as defined by the address in the packet. Endpoint connections 140 may connect to switch 125 via PCI Express links 130. Examples of endpoint connection 140 include host controllers such as a 1394 host controller or a PCI Express adapter cards. Other endpoint connections 140 can be connected through a switch 125, which connects via PCI Express link 130 using PCI Express link cable 131 that includes the PCI Express link.

Figure 3:
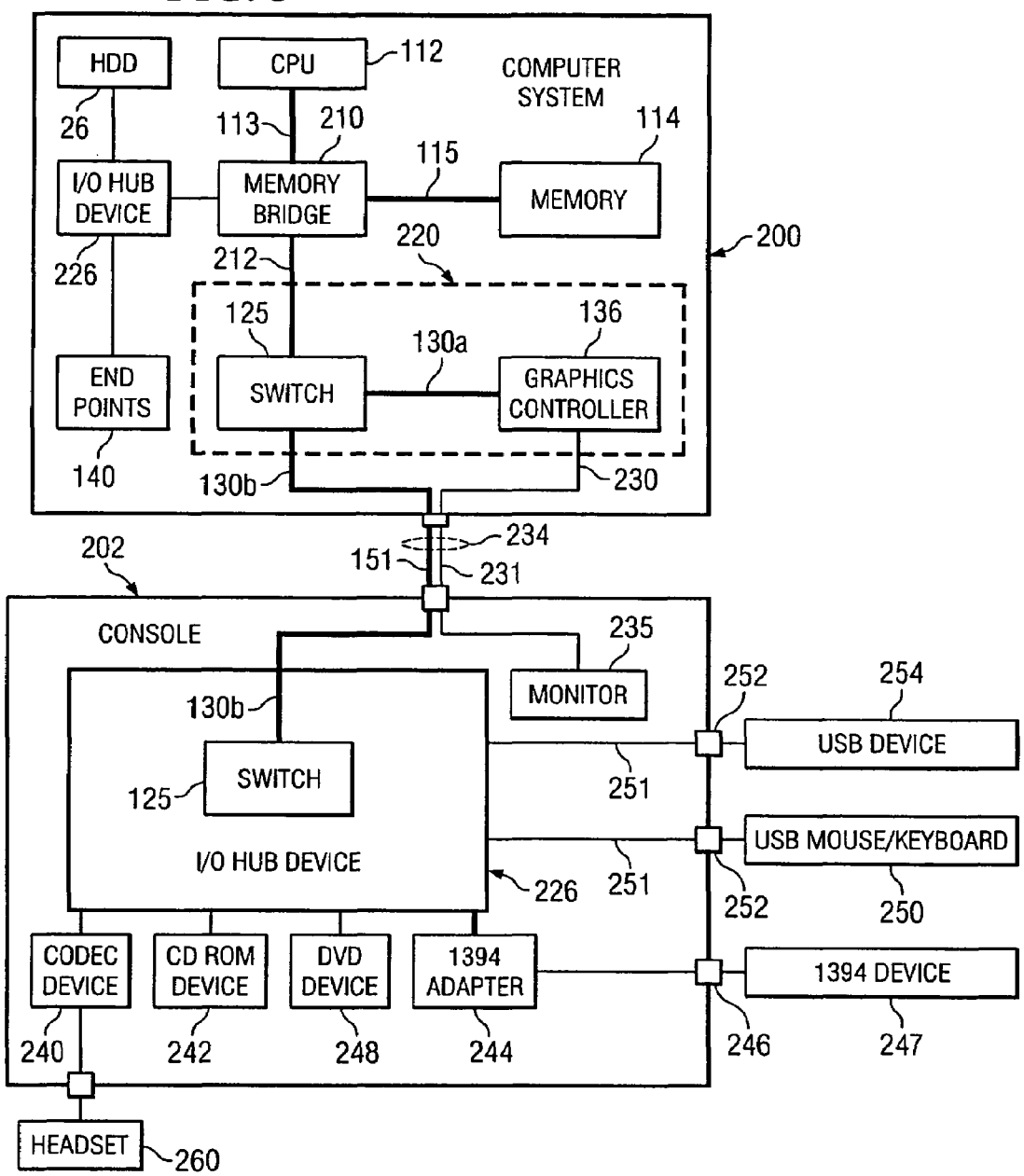
FIG. 3 is a schematic view of a computer system and console using a switch to route graphics data and data for a peripheral device on an interconnect according to an example embodiment of the present disclosure.

FIG. 3 is a schematic view of computer system 200 and console 202 using switch 125 to route graphics data and data for a peripheral device on an interconnect such as PCI Express link 130. Typically, computer system 200 includes CPU 112, memory 114, I/O hub device 226, hard disk drives 26, and memory bridge 210. CPU 112 and memory 114 connect through memory bridge 210 to provide graphics data and data for peripheral devices. CPU 112 may include processors, microprocessors, and any other suitable processing resource. Memory 114 may include volatile storage such as random access memory (RAM) and non-volatile memory such as read only memory (ROM).

I/O hub device 226 by be coupled to memory bridge 210 via a computer system link that allows hard disk drive (HDD) 26 and other devices to communicate with computer system 200. Other computer devices may connect to components of computer system 200 via endpoint connections 140. Typically, the computer devices placed in computer system 200 include those devices that have infrequent physical interaction with a user. For example, a CD-ROM drive requires physical interaction with a user to remove and insert a CD from the drive. However, hard disk drive 26 is merely access through computer system 200 via input devices and does not require physical interaction with a user.

Graphics card 220 may form a part of computer system 200 and may include switch 125 and graphics controller 136. Switch 125 connects to memory bridge 210 via memory bridge link 212, which may use a PCI Express architecture. Switch 125 receives data for a peripheral device and graphics data from memory bridge 210. Switch 125 routes the data to the appropriate location based on the address contained in each data packet such that the graphics data is sent to graphics controller 136 via graphics controller link 130*a*. In some instances, graphics controller link 130*a* is PCI Express.

Graphics controller 136 uses the graphics data to produce a video signal. The video signal may be transmitted from graphics controller 136 through video bus 230. Typically, video bus 230 carries the video signals from computer system 200 to console 202 via video cable 231. Video signals may include analog signals and/or digital signals depending upon the type of monitor 235 connected to console 202. For example, a digital video interface (DVI), created by the Digital Display Working Group (DDWG), may be used to generate a video signal to drive a digital flat-panel display, using a VESA Digital Flat Panel Standard (DFP), associated with console 202. Other examples of video signals include DVI-A that is used to provide an analog signal, video graphics array (VGA), and any other video signal suitable to drive a display.

Additionally, switch 125 may route the data for the peripheral device to peripheral link 130*b* in order to access the peripheral devices or other computer components. Peripheral link 130*b* includes a PCI Express link. The other computer components may include endpoint connections 140, other switches 125, and I/O hub device 226. Endpoint connections 140 may support attachment of a mouse, a keyboard, a speaker, a microphone, an optical drive (e.g., CD-ROM and DVD drives), a magnetic drive (e.g., a floppy disk drive), a camera, and any other suitable component to computer system 200 through other intermediate interfaces such as AC 97 and USB.

Console 202 may include I/O hub device 226 for connecting a plurality of peripheral devices to computer system 200. In one example embodiment, I/O hub device 226 includes switch 125 that receives data from peripheral link 130*b* via peripheral cable link 151, which typically uses the PCI Express architecture. Switch 125 coupled to I/O hub device 226 may be used to interface and route data to and from different peripheral devices.

In one example embodiment, I/O hub device 226 interfaces data for a peripheral device such as audio data to CODEC device 240, which may further connect with other audio components such as headset 260. I/O hub device 226 may also interface data for optical drives such as CD ROM device 242 and DVD device 248. Further, I/O hub device 226 may interface data for 1394 adapter 244, which may provide 1394 port 246 to allow other devices such as 1394 devices 247 to access computer system 200 via console 202.

In addition, I/O hub device 226 may interface with one or more USB ports 251 to connect other devices such as USB device 254 and USB Mouse/Keyboard 250 to computer system 200.

In some example embodiments, peripheral cable link 151 and video cable 231 may be formed at a single connector. The single connector allows for both video signals and data for peripheral devices to be sent to a console in a single cable. Although both video signals and data for peripheral devices may be included in a common cable, the cable may be shielded between the two different interconnects, namely one interconnect being a bus for video signals and the other interconnect being a link incorporating the PCI Express architecture.

Computer system 200 may be designed to operate with or without console 202. As such, all components described in console 202 may be included in computer system 200. Thus, depending on the design of the system, all, some or none of components associated with console 202 may be included in computer system 200, whether or not computer system 200 attaches to console 202. In some instances, computer system 200 includes these components and attaches to console 202; however, the system is designed to use the components associated with console 202. In addition, because PCI Express will discover all devices connected to the link, computer system 200 or console 202 may use a conventional display without having any peripherals associated with the display.

Figure 4:
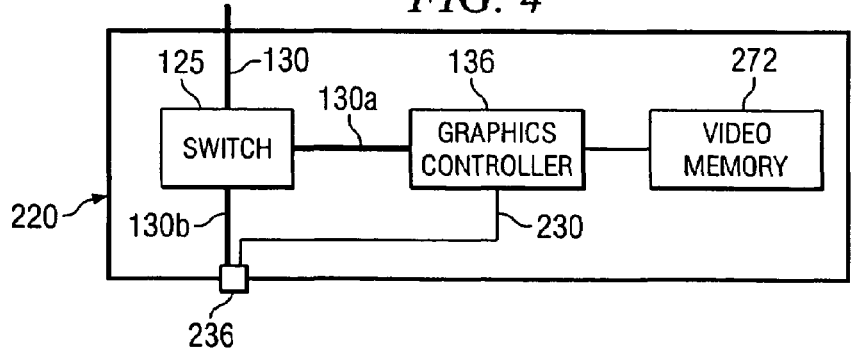
FIG. 4 is a schematic view of a graphics card including a switch to route graphics data and data for a peripheral device on an interconnect according to an example embodiment of the present disclosure.

FIG. 4 is a schematic view of graphics card 220 including switch 125 to route graphics data and data for peripheral devices on an interconnect. Graphics card 220 may receive graphics data and data for peripheral devices at switch 125 via PCI Express link 130. Typically, switch 125 is formed as a part of graphics card 220 and provides communications to computer system 200 via PCI Express link 130.

Because the PCI Express architecture uses a packet-based split transaction protocol, each packet of data may be sent in a separate transaction on PCI Express link 130. For example, a first packet of data from computer system 200 may include data for a peripheral device that is routed via switch 125 to the appropriate peripheral device. Before a response is sent from the peripheral device, a second packet of data may be received at switch 125 that may include graphics data that is routed to graphics controller 136 via graphics link 130a, wherein graphics controller 136 couples to video memory 272 to produce a video signal. The peripheral device may send a response to the first data packet back along peripheral link 130b to computer system 200 via switch 125.

In one example embodiment, graphics card 220 includes graphics card connector 236 that may be used to receive both peripheral link 130b and video bus 230. Graphics card connector 236 may be formed to allow a single connector to send both the video signals and the data for the peripheral device to console 202 or another similar device. Accordingly, graphics card connector 236 may allow for a single cable to be used between computer system 220 and console 202.

Figure 5:
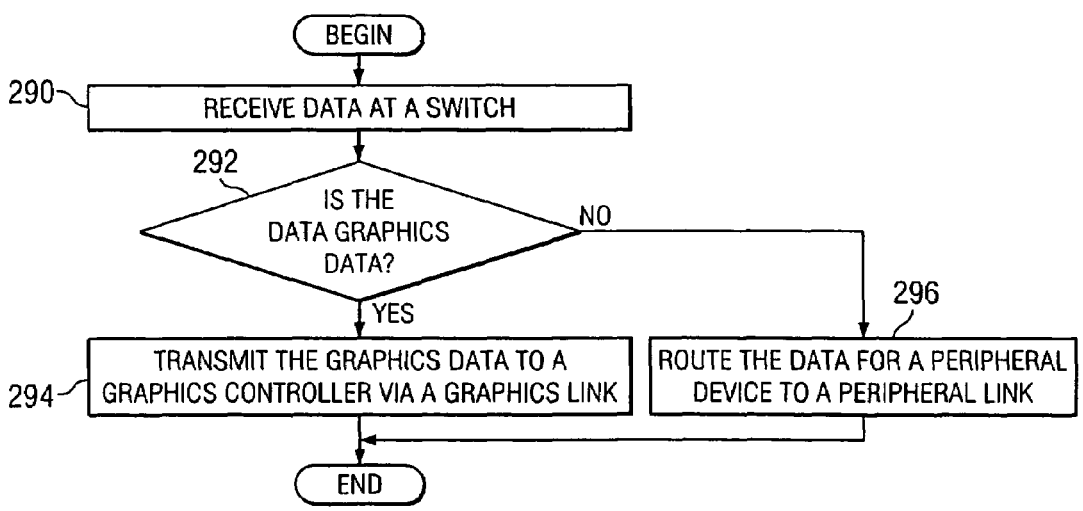
FIG. 5 illustrates a flowchart for using a switch to route graphics data and data for a peripheral device on an interconnect.

FIG. 5 illustrates a flowchart for using switch 125 to route graphics data and data for a peripheral device on an interconnect. At step 290, data is received at switch 125. The data may include graphics data or data for a peripheral device. The data is sent along an interconnect that incorporates the PCI Express architecture protocol, which partitions the data into packet-based transactions or packets. Each packet may include an address for routing the data to the correct device.

At step 292, switch 125 determines whether the data is graphics data based on the address contained in the packet. In the following example embodiment, switch 125 discriminates between data for a peripheral device and graphics data. In other embodiments, switch 125 may discriminate among several different types of data. If switch 125 determines that the data is graphics data, signal 125 routes the data to graphics controller 136 via graphics link 130a, at step 294.

However, if switch 125 determines that the data is data for a peripheral device, switch 125 routes the data to peripheral link 130b. In some embodiments, data for the peripheral device may be routed to an endpoint device through other switch 125, I/O hub device 226, or other interfaces before reaching the appropriate peripheral device.

Although the present disclosure has been described with respect to a specific embodiment, various changes and modifications will be readily apparent to one skilled in the art. The present disclosure is not limited to the illustrated embodiment, but encompasses such changes and modifications that fall within the scope of the appended claims.

What is claimed is:

1. An apparatus for routing data signals, comprising: a switch communicatively coupled to a first link, a second link and a third link; wherein:
   the first link is operable to transmit graphics data and data for a peripheral device;
   the switch is operable to route the graphics data to a controller via the second link, wherein the controller generates a video signal from the graphics data;
   the switch is further operable to route the data for the peripheral device to a peripheral input/output (I/O) device via the third link; and
   the first link, the second link and the third link comprise high bandwidth links of a single interconnect.

2. The apparatus of claim 1, wherein the controller comprises a graphics controller.

3. The apparatus of claim 1, wherein the video signal comprises a digital signal.

4. The apparatus of claim 1, wherein the video signal comprises an analog signal.

5. The apparatus of claim 1, wherein the peripheral I/O device comprises an I/O hub operable to route the data for the peripheral device to the peripheral device.

6. The apparatus of claim 1, further comprising a second switch disposed in the peripheral I/O device, the second switch operable to route the data for the peripheral devices to the peripheral device attached through an endpoint connection via the peripheral I/O device.

7. A method of routing data in an interconnect comprising a first link, a second link and a third link, comprising:
   receiving at a switch data via the first link, wherein the data include graphic data and data for a peripheral device;
   determining whether the data received at the switch is graphic data or data for a peripheral device; and
   routing graphics data to the second link and the data for a peripheral device to the third link.

8. The method of claim 7, further comprising: transmitting the graphics data to a controller via a second link; and
   generating a video signal operable to drive a video device based on the transmitted graphics data.

9. The method of claim 8, wherein the controller comprises a graphics controller.

10. The method of claim 8, wherein the video signal comprises a digital signal.

11. The method of claim 8, wherein the video signal comprises an analog signal.

12. The method of claim 7, wherein the data comprises a packet-based transaction.

13. A system of routing data using a switch, comprising:
the switch communicatively coupled to a first link operable to transmit data to the switch;
wherein the switch is operable to determine whether data transmitted from the first link is graphics data or data for a peripheral device;
wherein the switch is further operable to route the graphics data to a controller via a second link and to route data for a peripheral device to an input/output (I/O) device via a third link; and
wherein the first link, the second link and the third link comprise high bandwidth links of a single interconnect.

14. The system of claim 13, wherein the controller comprises a video controller such that a video signal is generated from the graphics data.

15. The system of claim 14, wherein the video signal comprises a digital signal.

16. The system of claim 14, wherein the video signal comprises a digital signal.

17. The system of claim 13, the I/O device comprises an I/O hub operable to route the data for the peripheral devices to at least one peripheral device.

* * * * *